(12) United States Patent
Irisa et al.

(10) Patent No.: US 9,555,604 B2
(45) Date of Patent: Jan. 31, 2017

(54) RESIN COMPOSITION AND BONDED COMPOSITE

(75) Inventors: Yuma Irisa, Ube (JP); Shuichi Maeda, Ube (JP)

(73) Assignee: UBE INDUSTRIES, LTD., Yamaguchi (JP)

( * ) Notice: Subject to any disclaimer, the term of this patent is extended or adjusted under 35 U.S.C. 154(b) by 695 days.

(21) Appl. No.: 13/979,011

(22) PCT Filed: Dec. 28, 2011

(86) PCT No.: PCT/JP2011/080427
§ 371 (c)(1),
(2), (4) Date: Jul. 10, 2013

(87) PCT Pub. No.: WO2012/096136
PCT Pub. Date: Jul. 19, 2012

(65) Prior Publication Data
US 2013/0295309 A1    Nov. 7, 2013

(30) Foreign Application Priority Data

Jan. 11, 2011  (JP) .................. 2011-002660
Jan. 11, 2011  (JP) .................. 2011-002661
(Continued)

(51) Int. Cl.
*B32B 27/34*    (2006.01)
*B32B 27/28*    (2006.01)
(Continued)

(52) U.S. Cl.
CPC .............. *B32B 27/281* (2013.01); *B32B 1/02* (2013.01); *B32B 1/08* (2013.01); *B32B 7/10* (2013.01);
(Continued)

(58) Field of Classification Search
CPC ......... C08G 69/36; C08G 69/40; C08G 69/08; C08G 69/10; C08G 69/14; B32B 1/02; B32B 1/08; B32B 27/281; B32B 27/285; B32B 27/34; Y10T 428/31721; Y10T 428/1393; Y10T 428/1352
See application file for complete search history.

(56) References Cited

U.S. PATENT DOCUMENTS

| 6,300,463 | B1 | 10/2001 | Figuly et al. | |
| 2003/0144462 | A1* | 7/2003 | Okushita | C08G 69/40 528/310 |
| 2010/0256502 | A1* | 10/2010 | Buckley | A61B 8/4281 600/466 |

FOREIGN PATENT DOCUMENTS

| JP | 62-074640 A | 4/1987 |
| JP | 11-179850 A | 7/1999 |

(Continued)

OTHER PUBLICATIONS

Office Action issued by the Japanese Patent Office in corresponding Japanese Patent Application No. 2012-552664 on Jun. 30, 2015 (6 pages).
(Continued)

*Primary Examiner* — Walter B Aughenbaugh
(74) *Attorney, Agent, or Firm* — Buchanan, Ingersoll & Rooney PC

(57) ABSTRACT

A resin composition, preferably an adhesive composition, comprising a polyether polyamide elastomer capable of being strongly bended with a polyimide resin, preferably strongly bended through an easy process to form an interface between the polyimide resin and the composition, and a bonded composite having the resin composition and a polyimide resin which together form an interface to be bonded with each other. A resin composition for forming an interface
(Continued)

together with a polyimide resin for bonding, wherein the resin composition comprises a polyether polyamide elastomer (component R) obtained by subjecting a specific aminocarboxylic acid compound A1 and/or lactam compound A2, polyether compound B, and dicarboxylic acid compound C to polymerization, wherein the content of the component R in the resin composition is 80 to 100% by weight.

16 Claims, 1 Drawing Sheet

(30) Foreign Application Priority Data

Jan. 11, 2011 (JP) .................................. 2011-002662
Jan. 11, 2011 (JP) .................................. 2011-002664

(51) Int. Cl.
| | |
|---|---|
| *B32B 1/02* | (2006.01) |
| *C08G 69/08* | (2006.01) |
| *C08G 69/14* | (2006.01) |
| *C08G 69/10* | (2006.01) |
| *C08G 69/36* | (2006.01) |
| *C08G 69/40* | (2006.01) |
| *C09J 177/02* | (2006.01) |
| *C09J 177/06* | (2006.01) |
| *B32B 1/08* | (2006.01) |
| *B32B 7/10* | (2006.01) |
| *C08G 73/10* | (2006.01) |

(52) U.S. Cl.
CPC ............ *B32B 27/285* (2013.01); *B32B 27/34* (2013.01); *C08G 69/08* (2013.01); *C08G 69/10* (2013.01); *C08G 69/14* (2013.01); *C08G 69/36* (2013.01); *C08G 69/40* (2013.01); *C08G 73/105* (2013.01); *C08G 73/1067* (2013.01); *C08G 73/1071* (2013.01); *C09J 177/02* (2013.01); *C09J 177/06* (2013.01); *B32B 2605/08* (2013.01); *B32B 2605/18* (2013.01); *Y10T 428/1352* (2015.01); *Y10T 428/1393* (2015.01); *Y10T 428/24628* (2015.01); *Y10T 428/31721* (2015.04)

(56) References Cited

FOREIGN PATENT DOCUMENTS

| | | | |
|---|---|---|---|
| JP | 2000-85007 | A | 3/2000 |
| JP | 2000-178519 | A | 6/2000 |
| JP | 2000-208564 | A | 7/2000 |
| JP | 2002-535465 | A | 10/2002 |
| JP | 2003-286341 | A | 10/2003 |
| JP | 2004-161964 | A | 6/2004 |
| JP | 2009-226658 | A | 10/2009 |
| WO | WO 2009/057805 | A1 | 5/2009 |

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) dated Jul. 25, 2013, issued in corresponding International Application No. PCT/JP2011/080427. (7 pages).

International Search Report (PCT/ISA/210) issued on Apr. 3, 2012, by the Japanese Patent Office as the International Searching Authority for International Application No. PCT/JP2011/080427.

* cited by examiner

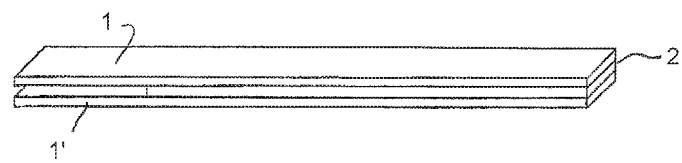

RESIN COMPOSITION AND BONDED COMPOSITE

FIELD OF THE INVENTION

The present invention relates to a resin composition for forming an interface together with a polyimide resin for bonding and a bonded composite having the resin composition and a polyimide resin which together form an interface to be bonded with each other.

BACKGROUND ART

Patent document 1 discloses a composite molded material formed by subjecting polyimide and a thermoplastic elastomer layer to heat welding.

Further, patent document 2 discloses a polyimide surface treatment for improving the bonding force between polyimide and the adhesive layer.

CITED REFERENCES

Patent Documents

Patent document 1: Japanese Unexamined Patent Publication No. Hei 11-179850

Patent document 2: Japanese Unexamined Patent Publication No. 2009-226658

DISCLOSURE OF THE INVENTION

Problems to be Solved by the Invention

However, in the composite molded material disclosed in patent document 1, the bonding force between the polyimide and the thermoplastic elastomer layer is not satisfactory.

Further, when a composite molded material having high bonding force between polyimide and a material different from the polyimide is obtained by the method disclosed in patent document 2, the surface treatment for polyimide must be added as a working step, and thus the number of the steps for process is inevitably increased, causing a problem in that the productivity is reduced.

That is, an adhesive composition for polyimide, which exhibits high bonding force merely through an easy process, has been difficult to obtain.

An object of the present invention is to provide a resin composition, preferably an adhesive composition, comprising a polyether polyamide elastomer capable of being strongly bonded with a polyimide resin, preferably strongly bonded through an easy process to form an interface between the polyimide resin and the composition, and a bonded composite having the resin composition and a polyimide resin which together form an interface to be bonded with each other.

Means to Solve the Problems

The present invention is directed to:
(1) a resin composition for forming an interface together with a polyimide resin for bonding,
wherein the resin composition comprises a polyether polyamide elastomer (component R) obtained by subjecting an aminocarboxylic acid compound (compound A1) and/or a lactam compound (compound A2), a polyether compound (compound B), and a dicarboxylic acid compound (compound C) to polymerization,
wherein the compound A1 is represented by the following formula (1):

$$H_2N-R^1-COOH \qquad (1)$$

wherein $R^1$ represents a linking group comprising a hydrocarbon chain, wherein the compound A2 is represented by the following formula (2):

$$\overset{\frown}{-R^2-CONH-} \qquad (2)$$

wherein $R^2$ represents a linking group comprising a hydrocarbon chain, wherein the compound B is a triblock polyether amine compound (compound B1) represented by the following formula (3):

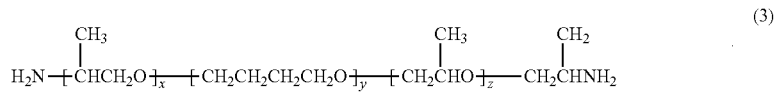

wherein x represents an integer of 1 to 20, y represents an integer of 4 to 50, and z represents an integer of 1 to 20 and/or a polyether compound (compound B2) represented by the following formula (4):

$$H-\!\!+\!\!O(CH_2)_4\!\!+\!\!_p\!\!-\!\!OH \qquad (4)$$

wherein p represents an integer of 1 to 50,
wherein the compound C is represented by the following formula (5):

$$HOOC-(-R^3-)_m-COOH \qquad (5)$$

wherein $R^3$ represents a linking group comprising a hydrocarbon chain, and m is 0 or 1,
wherein the content of the component R in the resin composition is 80 to 100% by weight; and
(2) a bonded composite having a polyimide resin and a resin composition P which together form an interface to be bonded with each other,
wherein the resin composition P is the resin composition according to item (1) above,
wherein the interface is in a planar, tubular, or spherical form.

Effect of the Invention

In the present invention, there can be provided a resin composition, preferably an adhesive composition, comprising a polyether polyamide elastomer capable of being strongly bonded with a polyimide resin, preferably strongly bonded through an easy process to form an interface between the polyimide resin and the composition, and a bonded composite having the resin composition and a polyimide resin which together form an interface to be bonded with each other.

BRIEF DESCRIPTION OF THE DRAWING

FIG. 1 A specimen having two polyimide films laminated together using the polyether polyamide elastomer adhesive so that the margin for gripping in a T-peel test (on the left-hand side of the FIGURE) is left.

MODE FOR CARRYING OUT THE INVENTION

The resin composition of the present invention comprises a polyether polyamide elastomer (component R) obtained by subjecting an aminocarboxylic acid compound (compound A1) and/or a lactam compound (compound A2), a polyether compound (compound B), and a dicarboxylic acid compound (compound C) to polymerization.

[Compounds A1 and A2]

Compound A1 is represented by the following formula (1):

$$H_2N—R^1—COOH \quad (1)$$

In the above formula, $R^1$ represents a linking group comprising a hydrocarbon chain, and is preferably an aliphatic, alicyclic, or aromatic hydrocarbon group having 2 to 20 carbon atoms or an alkylene group having 2 to 20 carbon atoms. $R^1$ is more preferably the above hydrocarbon group having 3 to 18 carbon atoms or alkylene group having 3 to 18 carbon atoms, further preferably the hydrocarbon group having 4 to 15 carbon atoms or alkylene group having 4 to 15 carbon atoms, especially preferably the hydrocarbon group having 10 to 15 carbon atoms or alkylene group having 10 to 15 carbon atoms.

Compound A2 is represented by the following formula (2):

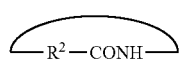

(2)

When compound A2 is used, a small amount of water is preferably added to the polymerization system from the viewpoint of facilitating the initiation of polymerization.

In the above formula, $R^2$ represents a linking group comprising a hydrocarbon chain, and is preferably an aliphatic, alicyclic, or aromatic hydrocarbon group having 3 to 20 carbon atoms or an alkylene group having 3 to 20 carbon atoms. $R^2$ is more preferably the above hydrocarbon group having 3 to 18 carbon atoms or alkylene group having 3 to 18 carbon atoms, further preferably the hydrocarbon group having 4 to 15 carbon atoms or alkylene group having 4 to 15 carbon atoms, especially preferably the hydrocarbon group having 10 to 15 carbon atoms or alkylene group having 10 to 15 carbon atoms.

As compound A1 and compound A2, at least one polyamide-forming monomer containing aliphatic, alicyclic, and/or aromatic moiety, which is selected from an co-aminocarboxylic acid, a lactam, and a substance synthesized from a diamine and a dicarboxylic acid and a salt thereof, is used.

In the substance synthesized from a diamine and a dicarboxylic acid and a salt thereof, examples of diamines include at least one diamine compound selected from an aliphatic diamine, an alicyclic diamine, an aromatic diamine, and derivatives thereof, and examples of dicarboxylic acids include at least one dicarboxylic acid compound selected from an aliphatic dicarboxylic acid, an alicyclic dicarboxylic acid, an aromatic dicarboxylic acid, and derivatives thereof.

Particularly, by using a combination of an aliphatic diamine compound and an aliphatic dicarboxylic acid compound, there can be obtained a polyether polyamide elastomer having low specific gravity and exhibiting large tensile elongation and excellent impact resistance as well as excellent melt formability.

The molar ratio of the diamine to the dicarboxylic acid (diamine/dicarboxylic acid) is preferably in the range of 0.9 to 1.1, more preferably in the range of 0.93 to 1.07, further preferably in the range of 0.95 to 1.05, especially preferably in the range of 0.97 to 1.03. When the diamine/dicarboxylic acid molar ratio falls within the above range, the molecular weight can be easily increased.

Specific examples of diamines include aliphatic diamines having 2 to 20 carbon atoms, such as ethylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylenediamine, 2,4,4-trimethylhexamethylenediamine, and 3-methylpentamethylenediamine.

Specific examples of dicarboxylic acids include aliphatic dicarboxylic acids having 2 to 20 carbon atoms, such as oxalic acid, succinic acid, glutaric acid, adipic acid, pimelic acid, suberic acid, azelaic acid, sebacic acid, and dodecanedioic acid.

Specific examples of lactams include aliphatic lactams having 5 to 20 carbon atoms, such as ε-caprolactam, ω-enanthlactam, ω-undecalactam, ω-dodecalactam, and 2-pyrrolidone.

Specific examples of ω-aminocarboxylic acids include aliphatic ω-aminocarboxylic acids having 5 to 20 carbon atoms, such as 6-aminocaproic acid, 7-aminoheptanoic acid, 8-aminooctanoic acid, 10-aminocapric acid, 11-aminoundecanoic acid, and 12-aminododecanoic acid.

Compound B is the below-mentioned compound B1 and/or compound B2.

Compound B1 is represented by the following formula (3):

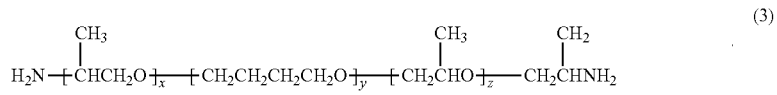

(3)

wherein x represents an integer of 1 to 20, y represents an integer of 4 to 50, and z represents an integer of 1 to 20.

As compound B1, there can be used, e.g., a XYX-type triblock polyether diamine compound produced by adding propylene oxide to both ends of poly(oxytetramethylene) glycol or the like to obtain polypropylene glycol, and then reacting ammonia or the like with an end of the polypropylene glycol.

Specific examples of XYX-type triblock polyether diamine compounds B1 include JEFFAMINE® XTJ-533 (corresponding to formula (3) wherein x is about 12, y is about 11, and z is about 11), JEFFAMINE® XTJ-536 (corresponding to formula (3) wherein x is about 8.5, y is about 17, and z is about 7.5), and JEFFAMINE® XTJ-542 (corresponding to formula (3) wherein x is about 3, y is about 9, and z is about 2), each of which is manufactured by HUNTSMAN International LLC., U.S.A.

Further, as XYX-type triblock polyether diamine compound B1, XYX-1 (corresponding to formula (3) wherein x is about 3, y is about 14, and z is about 2), XYX-2 (corresponding to formula (3) wherein x is about 5, y is about 14, and z is about 4), or XYX-3 (corresponding to formula (3) wherein x is about 3, y is about 19, and z is about 2) can be used.

In XYX-type triblock polyether diamine compound B1, from the viewpoint of surely and stably achieving the transparency, rubber elasticity, compatibility with the polyamide component, and toughness of the obtained component R, the following condition is preferred. Each of x and z is preferably 1 to 20, more preferably 1 to 18, more preferably 1 to 16, further preferably 1 to 14, further preferably 1 to 12.

y is preferably 4 to 50, more preferably 5 to 45, more preferably 6 to 40, further preferably 7 to 35, further preferably 8 to 30.

Further, preferred examples of combinations of x, y, and z include a combination of x in the range of 2 to 6, y in the range of 6 to 12, and z in the range of 1 to 5, and a combination of x in the range of 2 to 10, y in the range of 13 to 28, and z in the range of 1 to 9.

[Compound B2]

Compound B2 is represented by the following formula (4):

$$H\!-\!\!\left[\!O(CH_2)_4\!\right]_p\!\!-\!OH \qquad (4)$$

wherein p represents an integer of 1 to 50.

In compound B2, p is preferably 3 to 40, more preferably 5 to 30 from the viewpoint of surely and stably achieving the transparency, rubber elasticity, compatibility with the polyamide component, and toughness of the obtained component R.

[Compound C]

Compound C, which is a dicarboxylic acid compound, is represented by the following formula (5):

$$HOOC\!-\!\!\left(\!R^3\!\right)_m\!\!COOH \qquad (5)$$

wherein $R^3$ represents a linking group comprising a hydrocarbon chain, and m is 0 or 1.

From the viewpoint of surely and stably achieving the toughness of the obtained component R, $R^3$ is preferably an aliphatic, alicyclic, or aromatic hydrocarbon group having 1 to 20 carbon atoms or an alkylene group having 1 to 20 carbon atoms, more preferably an aliphatic, alicyclic, or aromatic hydrocarbon group having 1 to 15 carbon atoms or an alkylene group having 1 to 15 carbon atoms, further preferably an aliphatic, alicyclic, or aromatic hydrocarbon group having 2 to 12 carbon atoms or an alkylene group having 2 to 12 carbon atoms, further preferably an aliphatic, alicyclic, or aromatic hydrocarbon group having 4 to 10 carbon atoms or an alkylene group having 4 to 10 carbon atoms.

As compound C, at least one dicarboxylic acid selected from aliphatic, alicyclic, and aromatic dicarboxylic acids or a derivative thereof can be used.

Specific examples of dicarboxylic acids include linear aliphatic dicarboxylic acids having 2 to 25 carbon atoms, such as oxalic acid, succinic acid, glutaric acid, adipic acid, pimelic acid, suberic acid, azelaic acid, sebacic acid, and dodecanedioic acid; aliphatic dicarboxylic acids, such as dimer aliphatic dicarboxylic acids (dimer acids) having 14 to 48 carbon atoms formed by dimerization of an unsaturated fatty acid obtained by fractional distillation of triglyceride, and hydrogenation products thereof (hydrogenated dimer acids); alicyclic dicarboxylic acids, such as 1,4-cyclohexanedicarboxylic acid; and aromatic dicarboxylic acids, such as terephthalic acid and isophthalic acid.

As a commercially available dimer acid or hydrogenated dimer acid, for example, trade name "PRIPOL® 1004", "PRIPOL® 1006", "PRIPOL® 1009", or "PRIPOL® 1013", manufactured by Uniqema Inc., can be used.

[Component R]

Component R, which is a polyether polyamide elastomer, is a principal component of the resin composition of the present invention, and obtained by subjecting compound A1 and/or compound A2, compound B, and compound C to polymerization.

In the polymerization of compound A1 and/or compound A2, compound B, and compound C, from the viewpoint of surely and stably achieving the crystalline properties of component R to surely and stably obtain mechanical physical properties, such as strength and elastic modulus, of the resin composition per se of the present invention which is the composition of component R, and the viewpoint of suppressing the interfacial tension between component R and a polyimide resin so that a stable and satisfactory bond strength is surely obtained when the resin composition of the present invention and the polyimide resin together form an interface, the ratio of the total amounts of compound A1 and/or compound A2 to the total weight of component R is preferably 20 to less than 80% by weight, more preferably 20 to less than 60% by weight, further preferably 30 to less than 55% by weight, further preferably 35 to less than 45% by weight.

When component R is substantially formed from groups derived from compound A1 and/or compound A2, compound B, and compound C, the ratio of the amounts of compounds A1 and A2 to the total amounts of compounds A1, A2, B, and C {(A1+A2)/(A1+A2+B+C)} is preferably 20 to 80% by weight, more preferably 20 to 60% by weight, further preferably 30 to 55% by weight, further preferably 35 to 45% by weight.

The case where component R is substantially formed from groups derived from compound A1 and/or compound A2, compound B, and compound C indicates that the amount of the groups derived from compound A1 and/or compound A2, compound B, and compound C in component R is preferably 95 to 100% by weight, more preferably 97 to 100% by weight, further preferably 99 to 100% by weight, further preferably 100% by weight, based on the total weight of all the groups constituting component R.

In the polymerization for obtaining component R, amounts of the polyamide-forming monomer (i.e., aminocarboxylic acid compound A1 and/or lactam compound A2), polyether compound B when it is triblock polyether diamine compound B1, and dicarboxylic acid compound C are preferably such that the contained terminal carboxylic acid or carboxyl group and terminal amino group are almost equimolar.

Particularly, when the polyamide-forming monomer has an amino group as one terminal group and a carboxylic acid or a carboxyl group as another terminal group, amounts of polyether compound B when it is triblock polyether diamine compound B1 and dicarboxylic acid compound C are preferably such that the amino group of the polyether diamine and the carboxyl group of the dicarboxylic acid are almost equimolar.

[Properties of component R]

Component R preferably has a hardness (Shore D) in the range of 15 to 60, more preferably in the range of 20 to 55, further preferably in the range of 25 to 50, especially preferably in the range of 30 to 45. The hardness (Shore D) can be measured in accordance with ASTM D2240.

Component R preferably has an elastic modulus in flexure of 20 to 450 MPa, more preferably 20 to 400 MPa, further preferably 20 to 350 MPa, especially preferably 20 to 300 MPa. When the elastic modulus of component R falls within the above range, a bonded material having particularly excellent toughness and excellent rubber elasticity can be obtained. The elastic modulus in flexure can be measured in accordance with ASTM D790.

Component R preferably has a flexural strength of 0.8 to 15 MPa, more preferably 1 to 13 MPa, further preferably 1.1 to 10 MPa, especially preferably 1.2 to 9 MPa. When the flexural strength of component R falls within the above range, a bonded material having excellent balance between toughness, such as flexural strength, and rubber elasticity is advantageously obtained. The flexural strength can be measured in accordance with ASTM D790.

Component R preferably has a tensile strength at yield point in the range of 3 to 25 MPa, more preferably in the range of 3 to 22 MPa, further preferably in the range of 3 to 20 MPa, especially preferably in the range of 3 to 18 MPa. When the tensile strength at yield point of component R falls within the above range, a bonded material having particularly excellent toughness and excellent rubber elasticity can be obtained. The tensile strength at yield point can be measured in accordance with ASTM D638.

Component R preferably has a tensile elongation at break of 300% or more, more preferably 600% or more. When the tensile elongation at break of component R is smaller than the above range, the adhesive may disadvantageously suffer cohesive failure. The tensile elongation at break can be measured in accordance with ASTM D638.

It is preferred that component R suffers no breakage (abbreviated to NB) in the measurement of a notched Izod impact strength at 23° C. because the impact resistance is especially excellent in such a case. The notched Izod impact strength can be measured in accordance with ASTM D256.

Component R preferably has a deflection temperature under load of 50° C. or higher. When the deflection temperature under load of component R falls within the above range, the adhesive material is advantageously unlikely to suffer deformation during the use of the bonded material. The deflection temperature under load can be measured in accordance with ASTM D648.

Component R preferably has a relative viscosity ($\eta r$) in the range of 1.2 to 3.5 (0.5 mass/volume % m-cresol solution, 25° C.).

Component R has low water absorption properties and is excellent in, e.g., melt formability, shapability, toughness, resistance to hydrolysis, resistance to flexural fatigue, impact resilience, low specific gravity, low-temperature flexibility, low-temperature impact resistance, recovery properties from extension, sound deadening characteristics, elastomeric properties, and transparency.

[Method for Producing Component R]

With respect to the method for producing component R, there is no particular limitation.

For example, a method comprising the step of subjecting the polyamide-forming monomer (compound A1 and/or A2), compound B, and compound C to melt polymerization under a pressure and/or atmospheric pressure, if necessary, and further subjecting the resultant product to melt polymerization under a reduced pressure can be employed.

Further, a method comprising the step of subjecting all the polyamide-forming monomer (compound A1 and/or A2), compound B, and compound C to melt polymerization at the same time under a pressure and/or atmospheric pressure, if necessary, and further subjecting the resultant product to melt polymerization under a reduced pressure can be employed. Alternatively, a method comprising first subjecting two components, i.e., the polyamide-forming monomer (compound A1 and/or A2) and compound C to polymerization, and then subjecting the resultant product and compound B to polymerization can be employed.

In the production of component R, with respect to the method for charging the raw materials, there is no particular limitation. With respect to the amounts of the charged polyamide-forming monomer (compound A1 and/or A2), compound B, and compound C, the amount of the polyamide-forming monomer (compound A1 and/or A2) is preferably in the range of 10 to 95% by weight, more preferably 15 to 90% by weight, based on the total weight of the all raw materials, and the amount of compound B is preferably in the range of 3 to 88% by weight, more preferably 8 to 79% by weight, based on the total weight of the all raw materials.

Among the raw materials, compound B, which is compound B1, and compound C are preferably charged so that the amino groups in compound B and the carboxyl groups in compound C become almost equimolar.

The polymerization temperature is preferably 150 to 300° C., more preferably 160 to 280° C., further preferably 180 to 250° C. When the polymerization temperature is 150° C. or higher, the polymerization reaction advantageously proceeds. When the polymerization temperature is 300° C. or lower, thermal decomposition is suppressed, making it possible to obtain a polymer having excellent physical properties.

When an ω-aminocarboxylic acid is used as the polyamide-forming monomer (compound A1 and/or A2), component R can be produced by a method comprising an atmospheric melt polymerization, or steps of an atmospheric melt polymerization and a subsequent vacuum melt polymerization.

On the other hand, when a lactam, or a substance synthesized from a diamine and a dicarboxylic acid and/or a salt thereof is used as the polyamide-forming monomer (compound A1 and/or A2), component R can be produced by a method comprising a melt polymerization in the presence of an appropriate amount of water generally under a pressure of 0.1 to 5 MPa and a subsequent atmospheric melt polymerization and/or vacuum melt polymerization.

The polymerization time is generally 0.5 to 30 hours. When the polymerization time is 0.5 hour or more, the molecular weight can be increased. When the polymerization time is 30 hours or less, for example, discoloration caused due to thermal decomposition is suppressed, making it possible to obtain component R having desired physical properties.

The production of component R can be conducted either in a batchwise manner or in a continuous manner, and a batchwise reaction vessel, a single-bath or multi-bath continuous reactor, a tubular continuous reactor and others can be used individually or in combination.

In the production of component R, if necessary, for controlling the molecular weight or stabilizing the melt viscosity during the shaping, for example, a monoamine or a diamine, such as laurylamine, stearylamine, hexamethylenediamine, or metaxylylenediamine, or a monocarboxylic acid or a dicarboxylic acid, such as acetic acid, benzoic acid, stearic acid, adipic acid, sebacic acid, or dodecanedioic acid, can be added.

The above-mentioned monoamine, diamine, monocarboxylic acid, or dicarboxylic acid is preferably added in such an amount that the properties of the obtained component R are not sacrificed, and is preferably added in an appropriate amount so that the finally obtained elastomer has a relative viscosity in the range of 1.2 to 3.5 (0.5 mass/volume % m-cresol solution, 25° C.).

In the production of component R, if necessary, for example, phosphoric acid, pyrophosphoric acid, or polyphosphoric acid can be added as a catalyst. Further, for obtaining both effects of a catalyst and a heat resistant agent, an inorganic phosphorus compound, such as phosphorous acid, hypophosphorous acid, or an alkali metal salt or alkaline earth metal salt thereof, can be added. The amount of the above compound added is generally 50 to 3,000 ppm, based on the charged raw materials.

Resin Composition of the Present Invention

The resin composition of the present invention (hereinafter, frequently referred to as "the resin composition") comprises component R as a principal component, and preferably has advantageous properties equivalent to the above-mentioned advantageous properties of component R {hardness (Shore D), elastic modulus in flexure, flexural strength, tensile strength at yield point, tensile elongation at break, notched Izod impact strength at 23° C., deflection temperature under load, relative viscosity ($\eta r$), water absorption properties, melt formability, shapability, toughness, resistance to hydrolysis, resistance to flexural fatigue, impact resilience, low specific gravity, low-temperature flexibility, low-temperature impact resistance, recovery properties from extension, sound deadening characteristics, elastomeric properties, and transparency}.

From the viewpoint of reducing the interfacial tension between the resin composition of the present invention and a polyimide resin, with which the resin composition of the present invention is bonded to form an interface therebetween, to improve the affinity between them so as to improve the bonding properties, the contact angle between the molten component R (polyether polyamide elastomer) and the polyimide resin is preferably less than 25°, more preferably less than 21°, further preferably less than 17°. In this case, a bonded composite having a polyimide resin and the resin composition of the present invention which together form an interface to be strongly bonded with each other can be obtained.

The interface means an interfacial boundary formed between two phases which are in contact with each other. In the present invention, a polyimide resin constitutes one of the two phases and the resin composition of the present invention constitutes another one. When the phases are in contact with each other, an interface is formed at a portion in which the phases are in contact, and the entire surfaces of both of the phases need not be in contact with each other. For example, when the polyimide resin is in the form of a planar layer, the resin composition of the present invention may be in a dotted form and discontinuously in contact with the layer, or the resin composition of the present invention may be in the form of fine particles and embedded in the planar layer of the polyimide resin, so that all the surfaces of the fine particles of the resin composition of the present invention are brought into contact with the polyimide resin.

For obtaining the resin composition of the present invention having properties equivalent to the advantageous properties of component R, the content of component R in the resin composition is 80 to 100% by weight, preferably 90 to 100% by weight, more preferably 95 to 100% by weight, further preferably 99 to 100% by weight.

In the production of component R, as a component for the resin composition other than component R, a commercially available additive derived from component R, another polymer for improving the above-mentioned properties of the resin composition of the present invention, or an additive (such as a heat resistant agent, an ultraviolet light absorber, a light stabilizer, an antioxidant, an antistatic agent, a lubricant, an anti-slip agent, a crystal nucleating agent, a tackifier, a sealing property improving agent, an anti-fogging agent, a release agent, a plasticizer, a pigment, a dye, a perfume, a flame retardant, or a reinforcement) can be added.

As commercially available products of the resin composition of the present invention comprising a polyether polyamide elastomer which is component R, "UBESTA XPA® 9035X (trade name), UBESTA XPA® 9040×1, UBESTA XPA® 9040F1, UBESTA XPA® 9048×1, UBESTA XPA® 9048F1, UBESTA XPA® 9055×1, UBESTA XPA® 9055F1, UBESTA XPA® 9063×1, UBESTA XPA® 9063F1, UBESTA XPA® 9068×1, UBESTA XPA® 9068F1, UBESTA XPA® 9040×2, and UBESTA XPA® 9040F2", manufactured by Ube Industries, Ltd., can also be used.

[Adhesive Composition for Polyimide Resin]

The resin composition of the present invention is useful as an adhesive composition for polyimide resin (hereinafter, frequently referred to as "the adhesive composition" or "the polyether polyamide elastomer adhesive composition") which is to be bonded with a polyimide resin to form an interface.

The adhesive composition in the present invention is a hot-melt adhesive composition which exhibits bonding force with respect to a polyimide resin, and can be used in bonding polyimide with polyimide and bonding polyimide with a material different from the polyimide, and can be used for forming a composite comprising polyimide and the polyether polyamide elastomer adhesive composition.

The polyether polyamide elastomer adhesive composition in the present invention exhibits high bonding force, irrespective of the form of the polyimide resin with which the composition is bonded (e.g., film, expanded material, or shaped article), or the thickness of the polyimide film. Further, the adhesive composition and polyimide can be bonded with each other merely through an easy step of heat welding without a special treatment.

With respect to the bond strength of the adhesive composition of the present invention to a polyimide film, from the viewpoint of suppressing the occurrence of peeling at the end of bonded portion, the first maximum bond strength value as measured by a T-peel test is preferably 4.0 N/mm or more, more preferably 6.5 N/mm or more, further preferably 8.0 N/mm or more, further preferably 9.5 N/mm or more.

With respect to the bond strength of the adhesive composition of the present invention to a polyimide film, from the viewpoint of suppressing the occurrence of peeling at the end of bonded portion and surely and stably achieving the load for durability per unit bonded area, the average bond strength value as measured by a T-peel test is preferably 0.4 N/mm or more, more preferably 1.5 N/mm or more, further preferably 3.5 N/mm or more, further preferably 5.5 N/mm or more.

In the polyether polyamide elastomer adhesive composition in the present invention, a heat resistant agent, an ultraviolet light absorber, a light stabilizer, an antioxidant, an antistatic agent, a lubricant, an anti-slip agent, a crystal nucleating agent, a tackifier, a sealing property improving agent, an anti-fogging agent, a release agent, a plasticizer, a pigment, a dye, a perfume, a flame retardant, a reinforcement, or the like can be added in such an amount that the properties of the adhesive composition are not sacrificed.

[Polyimide Resin]

The polyimide resin with which the resin composition of the present invention is bonded to form an interface therebetween (hereinafter, frequently referred to as "polyimide resin") is a polymer compound having an imido bond obtained by subjecting to thermal or chemical imidation a polyimide precursor obtained from a tetracarboxylic dianhydride component and a diamine component. The polyimide resin has features such that the water absorption and coefficient of linear thermal expansion are low and the toughness, heat resistance, resistance to hydrolysis, chemical resistance, electrical insulating properties, and others are excellent.

Examples of tetracarboxylic dianhydride components include aromatic tetracarboxylic dianhydrides, aliphatic tetracarboxylic dianhydrides, and alicyclic tetracarboxylic dianhydrides. Specific examples of tetracarboxylic dianhydride components include 3,3',4,4'-biphenyltetracarboxylic dianhydride (hereinafter, frequently referred to as "s-BPDA"), pyromellitic dianhydride (hereinafter, frequently referred to as "PMDA"), 3,3',4,4'-oxydiphthalic dianhydride, diphenyl sulfone 3,4,3',4'-tetracarboxylic dianhydride, bis(3,4-dicarboxyphenyl) sulfide dianhydride, and 2,2-bis(3,4-dicarboxyphenyl)-1,1,1,3,3,3-hexafluoropropane dianhydride. Of these, s-BPDA and PMDA can be preferably used. The above tetracarboxylic dianhydride components can be used individually or in combination.

Examples of diamine components include aromatic diamines, aliphatic diamines, and alicyclic diamines. Specific examples of diamine components include p-phenylenediamine (hereinafter, frequently referred to as "PPD"), 4,4'-diaminodiphenyl ether (hereinafter, frequently referred to as "DADE"), 3,4'-diaminodiphenyl ether, m-tolidine, p-tolidine, 5-amino-2-(p-aminophenyl)benzoxazole, 4,4'-diaminobenzanilide, 1,3-bis(4-aminophenoxy)benzene, 1,4-bis(3-aminophenoxy)benzene, 1,4-bis(4-aminophenoxy)benzene, 3,3'-bis(3-aminophenoxy)biphenyl, 3,3'-bis(4-aminophenoxy)biphenyl, 4,4'-bis(3-aminophenoxy)biphenyl, 4,4'-bis(4-aminophenoxy)biphenyl, bis[3-(3-aminophenoxy)phenyl]ether, bis[3-(4-aminophenoxy)phenyl]ether, bis[4-(3-aminophenoxy)phenyl]ether, bis[4-(4-aminophenoxy)phenyl]ether, 2,2-bis[3-(3-aminophenoxy)phenyl]propane, 2,2-bis[3-(4-aminophenoxy)phenyl]propane, 2,2-bis[4-(3-aminophenoxy)phenyl]propane, and 2,2-bis[4-(4-aminophenoxy)phenyl]propane. Of these, PPD and DADE can be preferably used. The above diamine components can be used individually or in combination.

Preferred combinations of the tetracarboxylic dianhydride component and the diamine component are as follows.

(1) The tetracarboxylic dianhydride component is 3,3',4,4'-biphenyltetracarboxylic dianhydride and the diamine component is p-phenylenediamine.

(2) The tetracarboxylic dianhydride component is 3,3',4,4'-biphenyltetracarboxylic dianhydride and the diamine component is 4,4'-diaminodiphenyl ether.

(3) The tetracarboxylic dianhydride component is pyromellitic dianhydride and the diamine component is 4,4'-diaminodiphenyl ether.

When compound B2 is used as compound B used in the polymerization for obtaining component R, it is preferred that the polyimide resin is polyimide obtained by subjecting 3,3',4,4'-biphenyltetracarboxylic dianhydride as a tetracarboxylic dianhydride component and p-phenylenediamine as a diamine component to polymerization, or a polyimide resin obtained by subjecting pyromellitic dianhydride as a tetracarboxylic dianhydride component and 4,4'-diaminodiphenyl ether as a diamine component to polymerization. The component R has a low interfacial tension with the polyimide resin, and further component R and the polyimide chains undergo counter diffusion upon bonding with each other to form a thick interface layer, and therefore high bond strength can be obtained.

The synthesis of a polyimide precursor is achieved by subjecting a tetracarboxylic dianhydride component and a diamine component, which are substantially equimolar, to random polymerization or block polymerization in an organic solvent. The polyimide precursor solution as such or, if necessary, from which the solvent is removed or to which a solvent is added, is applied onto a support by casting and heated or dried to such an extent that the resultant film becomes self-supporting, for example, the film can be peeled off the support. The heating temperature and heating time can be appropriately determined. Thus, a self-supporting film can be obtained. Subsequently, the self-supporting film is allowed to travel through a heating oven so that the film is heated to effect imidation, producing a polyimide film. The temperature profile in the heating treatment for imidation can be appropriately selected according to the physical properties of a desired polyimide film.

For example, the film is gradually heated under conditions such that the temperature falls in the range of 180 to 600° C. for, e.g., 0.05 to 5 hours.

In the case of chemical imidation, a dehydrating agent and a catalyst are added to the above-mentioned polyimide precursor solution.

As a polyimide resin used as an adherend for the resin composition of the present invention, preferably an adhesive resin composition, those conventionally known can be used. Examples of commercially available products of polyimide especially suitable for the adherend include UPILEX® S series, UPILEX® R series, manufactured by Ube Industries, Ltd., Kapton® series, manufactured by DuPont-Toray Co., Ltd., and APICAL® series, manufactured by Kaneka Corporation.

UPILEX® S is a polyimide resin derived mainly from 3,3',4,4'-biphenyltetracarboxylic dianhydride as a tetracarboxylic dianhydride component and p-phenylenediamine as a diamine component.

UPILEX® R is a polyimide resin derived mainly from 3,3',4,4'-biphenyltetracarboxylic dianhydride as a tetracarboxylic dianhydride component and 4,4'-diaminodiphenyl ether as a diamine component.

Kapton® H is a polyimide resin derived mainly from pyromellitic dianhydride as a tetracarboxylic dianhydride component and 4,4'-diaminodiphenyl ether as a diamine component.

[Bonded Composite]

The bonded composite of the present invention (hereinafter, frequently referred to as "the bonded composite") is a bonded composite having a polyimide resin and the resin composition of the present invention which together form an interface to be bonded with each other, wherein the interface is included in a planar, tubular, or spherical surface.

The planar surface means that the surface including the interface is substantially planar, and, for example, there can be mentioned a rectangular interface (which may be so long in the lengthwise direction that it can be wound as long as the interface has an end portion) appearing in a laminated film or laminated sheet, which is a laminated material having the below-mentioned laminated structure.

The tubular surface means that the surface including the interface has at least one end portion, and, for example, there can be mentioned an interface appearing in a hemispherical laminated material or cylindrical laminated material, which is a laminated material having the below-mentioned laminated structure.

The spherical surface means that the surface including the interface forms a closed surface without an end portion, and, for example, there can be mentioned an interface appearing in a spherical or polyhedral (such as soccer ball) laminated material, which is a laminated material having the below-mentioned laminated structure.

For example, all the surface including the interface may constitute the interface, or the interface may be distributed discontinuously in the surface, for example, the surface including the interface may have an uneven pattern, such as a dotted form, such that the edge face of the protrusion constitutes the interface.

From the viewpoint of more effectively utilizing the bond strength of the interface, the proportion of the area of the interface to the surface including the interface is preferably 50 to 100%, more preferably 70 to 100%, further preferably 80 to 100%, further preferably 90 to 100%, further preferably 95 to 100%, further preferably 100% (that is, all the polyimide resin adheres to the resin composition of the present invention facing the polyimide resin to form an interface).

From the viewpoint of more effectively utilizing the bond strength of the interface, the interface is preferably in a planar form, more preferably in a film form or sheet form.

With respect to the form of the whole bonded composite, the bonded composite in a planar, tubular, or spherical form is highly practical. Examples of such forms include planar forms, such as a film and a sheet, bag forms, such as an industrial bag and an industrial laminated tube, tubular forms, and spherical forms, such as a bag and a ball. From the viewpoint of more effectively utilizing the bond strength of the interface, the bonded composite is preferably in a planar form, more preferably in a film form or sheet form.

For utilizing the bonding properties of the resin composition of the present invention with polyimide, it is preferred that the bonded composite comprises a laminated structure formed by laminating layer a comprised of the polyimide resin, layer b comprised of the resin composition of the present invention (resin composition P), and layer c comprised of resin composition Q different from resin composition P, wherein the layer a and layer b together form an interface to be bonded with each other, and the layer b and layer c together form an interface to be bonded with each other.

For example, when the resin composition comprises component R, the bonded composite is a bonded composite having component R directly bonded with a polyimide resin, and includes a bonded composite comprising only two layers, i.e., layer a comprised of the polyimide resin and layer b comprised of component R, a bonded composite comprising layer a (polyimide layer) and layer b (polyether polyamide elastomer layer) which are alternately bonded with each other, and a mode of bonded composite in which the polyimide resin and resin composition Q (material different from resin composition P) are bonded through layer b (polyether polyamide elastomer layer) and they are unified in the order of layer a-layer b-layer c (polyimide-polyether polyamide elastomer-material different from resin composition P).

From the viewpoint of surely and stably achieving the toughness of the bonded composite and the bond strength of the interface between layer a and layer b, the thickness of layer a is preferably 7.5 to 200 μm, more preferably 12 to 150 μm, further preferably 20 to 100 μm.

From the viewpoint of surely and stably achieving the toughness of the bonded composite and the bond strength of the interface between layer a and layer b and the interface between layer b and layer c, the thickness of layer b is preferably 10 μm or more, more preferably 30 to 500 μm, further preferably 50 to 300 μm, further preferably 80 to 250 μm, further preferably 100 to 200 μm, further preferably 100 to 150 μm.

From the viewpoint of surely and stably achieving the bond strength of the interface between layer b and layer c, the thickness of layer c is preferably 10 μm or more, more preferably 30 μm to 10 mm, further preferably 50 to 1,000 μm.

With respect to the bond strength of the bonded composite having component R and a polyimide resin of the present invention, from the viewpoint of suppressing peeling of the bonded composite at the end of bonded portion, the first maximum bond strength value as measured by a T-peel test using a bonded composite having a polyimide resin film and component R for evaluation is preferably 4.0 N/mm or more, more preferably 6.5 N/mm or more, further preferably 8.0 N/mm or more, further preferably 9.5 N/mm or more.

With respect to the bond strength of the bonded composite of the present invention, from the viewpoint of suppressing peeling of the bonded composite at the end of bonded portion and surely and stably achieving the load for durability per unit bonded area, the average bond strength value as measured by a T-peel test using a bonded composite having a polyimide resin film and component R for evaluation is preferably 0.4 N/mm or more, more preferably 1.50 N/mm or more, further preferably 1.75 N/mm or more, further preferably 2.00 N/mm or more.

EXAMPLES

Hereinbelow, the present invention will be described in more detail with reference to the following Examples, which should not be construed as limiting the scope of the present invention.

The values for properties of component R are measured as follows unless otherwise specified.

[Conditions for Measurement of Physical Properties]

(1) Relative Viscosity ($\eta r$) (0.5 Weight/Volume % m-Cresol Solution, 25° C.):

A relative viscosity was measured using m-cresol of a special grade reagent as a solvent at a concentration of 5 g/dm$^3$ and using an Ostwald viscometer at 25° C.

(2) Terminal Carboxyl Group Concentration ([COOH]):

40 ml of benzyl alcohol was added to about 1 g of a polymerization product, and the product was dissolved by heating at 180° C. in a nitrogen gas atmosphere, and phenolphthalein as an indicator was added to the resultant sample solution, and the sample was subjected to titration using an N/20 potassium hydroxide-ethanol solution.

(3) Terminal Amino Group Concentration ([NH$_2$]):

About 1 g of a polymerization product was dissolved in 40 ml of a phenol/methanol mixed solvent (volume ratio: 9/1), and Thymol Blue as an indicator was added to the resultant sample solution, and the sample was subjected to titration using N/20 hydrochloric acid.

(4) Number Average Molecular Weight (Mn):

A number average molecular weight (Mn) was determined from the following formula (6) using a terminal carboxyl group concentration ([COOH]) and a terminal amino group concentration ([NH$_2$]).

$$Mn = \frac{2}{\text{Terminal amino group concentration [NH}_2\text{]} + \text{Terminal carboxyl group concentration [COOH]}} \quad (6)$$

(5) Melting Temperature (Tm) and Crystallization Temperature (Tc)

Tm and Tc were measured in a nitrogen gas atmosphere using a differential scanning calorimeter DSC-50, manufactured by Shimadzu Corporation.

The temperature was increased from room temperature to 230° C. at a rate of 10° C./minute (called a temperature increase first run), and maintained at 230° C. for 10 minutes, and then reduced to −100° C. at a rate of 10° C./minute (called a temperature reduction first run), and subsequently increased to 230° C. at a rate of 10° C./minute (called a temperature increase second run).

From the obtained DSC chart, an exothermic peak temperature in the temperature reduction first run was taken as Tc, and an endothermic peak temperature in the temperature increase second run was taken as Tm.

(6) Strength and Young's Modulus (Tensile Test)

The polyether polyamide elastomer pellets were placed between SUS plates, together with a 150 μm spacer, and preheated at 200° C. under 0.05 MPa for one minute, and then hot-pressed under conditions at 200° C. under 10 MPa for one minute to form a polyether polyamide elastomer in a sheet form, and the resultant sheet was cut into a size having a width of 2 mm and a length of 40 mm to obtain a test specimen.

The obtained specimen was dried in a vacuum atmosphere at 80° C. for 20 hours, and then transferred into a room having an atmosphere at 50 RH at 23° C. and, immediately after this, a tensile test was performed using a tensile testing machine TENSILON RTA-500, manufactured by Orientec Co., Ltd., under conditions such that the chuck distance was 20 mm and the crosshead speed was 2 mm/min.

A value of the stress at yield point in the stress-strain curve obtained by the test was taken as a strength, and the initial slope of the tangent of the curve was taken as a Young's modulus. With respect to the value of cross-sectional area of the specimen used in the determination of the stress, on the assumption that the cross-section of the specimen is rectangular, a value of the apparent cross-sectional area obtained by multiplying the width with the thickness of each specimen before the test was used. The results of the measurement are shown in Table 1.

(7) Contact Angle Measurement Test

The polyether polyamide elastomer pellets were placed on a 15 mm×40 mm polyimide film on a hot plate, and a glass case having a capacity of 40 cm$^3$ was placed so as to cover the whole of polyimide film. While permitting N$_2$ gas to flow through the case at a flow rate of 40 ml/min, the hot plate was heated to 200° C. With respect to the polyether polyamide elastomer which was molten on the polyimide film into a droplet, a projected image of the droplet in the horizontal direction was photographed, and dimensions of the photographed droplet were measured and, using the formula shown below, a contact angle was determined by making a calculation.

$$\text{Contact angle} = 2\tan^{-1}\left(\frac{\text{Height of the droplet}}{0.5 \times \text{Width of the droplet}}\right) \quad (7)$$

The photographing an image was performed every 60 minutes, and a contact angle obtained at a point in time when the change of the determined contact angle from that obtained 60 minutes earlier was within ±1° was employed as a contact angle between the polyether polyamide elastomer and the polyimide. The values of measured contact angles are shown in Table 1.

Resin Composition Using Component R Wherein Compound B is Compound B1

Example 1

Production of PAE 1

Into a 5-liter pressure vessel equipped with a stirrer, a thermometer, a torque meter, a pressure gauge, a nitrogen gas feed inlet, a pressure controlling apparatus, and a polymer withdrawal port were charged:

1,400.01 g of compound A1: 12-aminododecanoic acid (manufactured by Ube Industries, Ltd.);

524.66 g of compound B: ABA-type triblock polyether diamine (trade name: XTJ-542, manufactured by HUNTSMAN International LLC.; amine value: 1.94 meq/g);

75.34 g of compound C: adipic acid (special grade reagent);

1.13 g of a 35.55% by weight aqueous solution of sodium hypophosphite; and 5.00 g of an antioxidant (trade name: Tominox® 917, manufactured by Yoshitomi Pharmaceutical Industries, Ltd.).

The vessel was satisfactorily purged with nitrogen gas and then, while feeding nitrogen gas at a flow rate of 500 ml/minute, gradual heating was made. The stirring was performed at a speed of 50 rpm.

The temperature was elevated from room temperature to 225° C. over 4 hours, and a polymerization was conducted at 225° C. for 10 hours.

Then, the stirring was stopped, and a colorless and transparent polymer in the molten state was withdrawn in a strand form from the polymer withdrawal port, and cooled with water, and then pelletized to obtain about 1.70 kg of pellets (PAE 1).

The obtained polymerization product was a white tough and flexible polymer having excellent rubber elasticity, and had the following properties:

ηr=2.14,
[COOH]=2.02×10−5 eq/g,
[NH$_2$]=1.78×10−5 eq/g,
Mn=53,000, Tm=163° C., Tc=118° C.

Example 2

Production of PAE 2

Into a 5-liter pressure vessel equipped with a stirrer, a thermometer, a torque meter, a pressure gauge, a nitrogen gas feed inlet, a pressure controlling apparatus, and a polymer withdrawal port were charged:

1,120.02 g of compound A1: 12-aminododecanoic acid (manufactured by Ube Industries, Ltd.);

769.51 g of compound B: ABA-type triblock polyether diamine (trade name: XTJ-542, manufactured by HUNTSMAN International LLC.; amine value: 1.94 meq/g);

110.50 g of compound C: adipic acid (special grade reagent);

2.81 g of a 35.55% by weight aqueous solution of sodium hypophosphite; and 5.00 g of an antioxidant (trade name: Tominox 917, manufactured by Yoshitomi Pharmaceutical Industries, Ltd.).

The vessel was satisfactorily purged with nitrogen gas and then, while feeding nitrogen gas at a flow rate of 500 ml/minute, gradual heating was made. The stirring was performed at a speed of 50 rpm.

The temperature was elevated from room temperature to 225° C. over 4 hours, and a polymerization was conducted at 225° C. for 10 hours.

Then, the stirring was stopped, and a colorless and transparent polymer in the molten state was withdrawn in a strand form from the polymer withdrawal port, and cooled with water, and then pelletized to obtain about 1.66 kg of pellets (PAE 2).

The obtained polymerization product was a white tough and flexible polymer having excellent rubber elasticity, and had the following properties:

$\eta r=2.22$,
$[COOH]=1.61 \times 10-5$ eq/g,
$[NH_2]=2.17 \times 10-5$ eq/g,
$Mn=53,000$, $Tm=153°$ C., $Tc=109°$ C.

Example 3

Production of PAE 3

Into a 5-liter pressure vessel equipped with a stirrer, a thermometer, a torque meter, a pressure gauge, a nitrogen gas feed inlet, a pressure controlling apparatus, and a polymer withdrawal port were charged:

800.02 g of compound A1: 12-aminododecanoic acid (manufactured by Ube Industries, Ltd.);

1,049.30 g of compound B: ABA-type triblock polyether diamine (trade name: XTJ-542, manufactured by HUNTSMAN International LLC.; amine value: 1.94 meq/g);

150.68 g of compound C: adipic acid (special grade reagent);

2.81 g of a 35.55% by weight aqueous solution of sodium hypophosphite; and 5.00 g of an antioxidant (trade name: Tominox 917, manufactured by Yoshitomi Pharmaceutical Industries, Ltd.).

The vessel was satisfactorily purged with nitrogen gas and then, while feeding nitrogen gas at a flow rate of 500 ml/minute, gradual heating was made.

The stirring was performed at a speed of 50 rpm.

The temperature was elevated from room temperature to 225° C. over 4 hours, and a polymerization was conducted at 225° C. for 10 hours.

Then, the stirring was stopped, and a colorless and transparent polymer in the molten state was withdrawn in a strand form from the polymer withdrawal port, and cooled with water, and then pelletized to obtain about 1.68 kg of pellets (PAE 3).

The obtained polymerization product was a white tough and flexible polymer having excellent rubber elasticity, and had the following properties:

$\eta r=2.16$,
$[COOH]=1.28 \times 10-5$ eq/g,
$[NH_2]=1.86 \times 10-5$ eq/g,
$Mn=64,000$, $Tm=135°$ C., $Tc=59°$ C.

Example 4

Production of PAE 4

Into a reaction vessel having a capacity of 5 liters and being equipped with a stirrer, a thermometer, a torque meter, a pressure gauge, a nitrogen gas feed inlet, a pressure controlling apparatus, and a polymer withdrawal port were charged:

629.8 g of compound A1: 12-aminododecanoic acid (ADA) (manufactured by Ube Industries, Ltd.);

1,200.0 g of compound B: ABA-type triblock polyether diamine (XTJ-542, manufactured by HUNTSMAN International LLC.; amine value: 1.94 meq/g);

170.2 g of compound C: adipic acid (AA);

2.81 g of a 35.55% by weight aqueous solution of sodium hypophosphite; and 5.00 g of an antioxidant (trade name: Tominox 917, manufactured by Yoshitomi Pharmaceutical Industries, Ltd.).

The vessel was satisfactorily purged with nitrogen gas and then, while feeding nitrogen gas at a flow rate of 500 ml/minute, gradual heating was made.

The stirring was performed at a speed of 50 rpm.

The temperature was elevated from room temperature to 225° C. over 4 hours, and a polymerization was conducted at 225° C. for 10 hours.

Then, the stirring was stopped, and a colorless and transparent polymer in the molten state was withdrawn in a strand form from the polymer withdrawal port, and cooled with water, and then pelletized to obtain PAE 4 pellets (PAE 4).

The obtained polymerization product was a white tough and flexible polymer having excellent rubber elasticity, and had the following properties:

$\eta r=1.82$,
$[COOH]=3.19 \times 10-5$ eq/g,
$[NH_2]=5.05 \times 10-5$ eq/g,
$Mn=24,000$, $Tm=127°$ C., $Tc=52°$ C.

Resin Composition Wherein Compound B is Compound B2

Example 5

PAE 5

PEBAX® 6333 (manufactured by Arkema K. K.)

Example 6

PAE 6

PEBAX® 5533 (manufactured by Arkema K. K.)

Resin Composition for Comparison

Comparative Example 1

Production of PA 12

Into an autoclave having an inner capacity of 80 cm³ were charged 24 g of ω-laurolactam and 1.32 g of water, and the resultant mixture was heated at 260° C. for 27.5 hours to effect a pre-polymerization.

The pressure was 18.5 kgf/cm²G.

Then, the resultant pre-polymerization product was subjected to melt polycondensation at a temperature of 250° C. under a pressure of 760 mmHg for 3 hours.

The resultant polymer in the molten state was withdrawn in a strand form, and cooled with water, and then pelletized to obtain polyamide 12 pellets (PA 12).

The obtained post-polymerization product was dissolved in 98% sulfuric acid at a concentration of 10 g/dm³ and subjected to measurement of a relative viscosity (Yr) at a temperature of 25° C. As a result, it was found that the relative viscosity was 3.15 and the polymerization product had a number average molecular weight of about 30,000.
[Polyimide Resin Film]

The polyimide resin films shown below were used.
(1) UPILEX® S (manufactured by Ube Industries, Ltd.) 125S, 75S, 50S, 25S (numerals indicate a thickness (μm) of each film)
(2) UPILEX® R (manufactured by Ube Industries, Ltd.) 50RN (thickness: 50 μm)
(3) Kapton® (manufactured by DuPont-Toray Co., Ltd.) 200H (thickness: 50 μm)

Examples 7 to 24 and Comparative Examples 2 and 3

Using PAE's 1 to 4 and PA 12 as an adhesive composition for polyimide, bonded composites were produced as follows.
(1) Preparation of a Bonded Specimen of the Polyether Polyamide Elastomer and Polyimide Pellets of each of the above-obtained PAE's 1 to 4 were placed between SUS plates, together with a 150 μm spacer, and preheated at 200° C. under 0.05 MPa for one minute, and then hot-pressed under conditions at 200° C. under 10 MPa for one minute to obtain a resin composition in a sheet form comprising the polyether polyamide elastomer.

A resin composition in a sheet form was obtained in substantially the same manner as mentioned above except that PA 12 was used instead of PAE's 1 to 4.

The above-obtained resin composition in a sheet form comprising the polyether polyamide elastomer and a spacer were placed between the polyimide films, and preheated at 200° C. under 0.05 MPa for one minute, and then hot-pressed under conditions at 200° C. under 10 MPa for one minute to obtain a bonded specimen having the resin composition comprising the polyether polyamide elastomer and polyimide.

In the forming, a spacer was appropriately used so that the resin was not contained in an unnecessary portion, such as the margin for gripping in a bond strength evaluation test.

The above-obtained bonded specimen was cut using a cutting knife to prepare a specimen for bond strength evaluation having a width of 10 mm and a length of 250 mm as shown in FIG. 1.

(2) Bond Strength Test

Using a T-peel testing machine TENSILON RTA-500, manufactured by Orientec Co., Ltd., a bond strength was measured at a crosshead speed of 50 mm/min. with respect to the above-prepared specimen.

A method for the test is as follows. In the laminated specimen shown in FIG. 1, the upper and lower protruding portions of polyimide films 1 and 1' seen on the left-hand side of the FIGURE were held by a chuck and a T-peel test was conducted to determine a first maximum bond strength and an average bond strength provided by polyether polyamide elastomer sheet 2.

The results are shown in Table 1. The first maximum bond strength is a value obtained by dividing the first maximum load value by the width of the specimen, and the average bond strength is an arithmetic mean value of the values individually obtained by dividing the load at the turning point in the load-displacement curve for 50 mm peeling from the initial load point through 200 mm peeling by the width of each specimen.

TABLE 1

| | | Resin composition | | | | | Polyimide resin | | First maximum bond strength N/mm | Average bond strength N/mm | Contact angle ° |
|---|---|---|---|---|---|---|---|---|---|---|---|
| | | Component R content wt % | (A1 + A2)/ (A1 + A2 + B + C) wt % | Strength MPa | Young's modulus MPa | Layer b thickness μm | | Layer a thickness μm | | | |
| Example 7 | PAE1 | 99.7 | 70.0 | 12.5 | 163 | 125 | UPILEX S | 125 | 9.52 | 2.09 | 24.9 |
| Example 8 | PAE2 | 99.7 | 56.0 | 9.2 | 106 | 125 | UPILEX S | 125 | 12.20 | 3.88 | 16.1 |
| Example 9 | PAE3 | 99.7 | 40.0 | 6.5 | 57 | 125 | UPILEX S | 125 | 10.37 | 6.05 | 11.2 |
| Example 10 | PAE4 | 99.7 | 31.5 | 5.3 | 42 | 125 | UPILEX S | 125 | 10.32 | 6.12 | 12.5 |
| Example 11 | PAE5 | 90-100 | — | 13.8 | 180 | 125 | UPILEX S | 125 | 0.92 | 0.46 | 28.1 |
| Example 12 | PAE6 | 90-100 | — | 10.4 | 110 | 125 | UPILEX S | 125 | 1.82 | 0.92 | 17.5 |
| Comparative Example 2 | PA12 | 100.0 | 100.0 | 29.1 | 778 | 125 | UPILEX S | 125 | 0.84 | 0.10 | 41.3 |
| Example 13 | PAE1 | 99.7 | 70.0 | 12.5 | 163 | 125 | Kapton 200H | 50 | 11.40 | PI Break | 13.0 |
| Example 14 | PAE3 | 99.7 | 40.0 | 6.5 | 57 | 125 | Kapton 200H | 50 | 10.71 | PI Break | 25.5 |
| Example 15 | PAE5 | 90-100 | — | 13.8 | 180 | 125 | Kapton 200H | 50 | 7.62 | — | — |
| Example 16 | PAE6 | 90-100 | — | 10.4 | 110 | 125 | Kapton 200H | 50 | 4.10 | — | — |
| Comparative Example 3 | PA12 | 100.0 | 100.0 | 29.1 | 778 | 125 | Kapton 200H | 50 | 1.52 | 0.19 | 41.3 |
| Example 17 | PAE1 | 99.7 | 70.0 | 12.5 | 163 | 125 | UPILEX S | 75 | 10.91 | 2.57 | 23.7 |
| Example 18 | PAE1 | 99.7 | 70.0 | 12.5 | 163 | 125 | UPILEX S | 25 | 8.61 | PI Break | 24.4 |

TABLE 1-continued

| | | Resin composition | | | | | Polyimide resin | | First maximum bond strength N/mm | Average bond strength N/mm | Contact angle ° |
|---|---|---|---|---|---|---|---|---|---|---|---|
| | | Component R content wt % | (A1 + A2)/ (A1 + A2 + B + C) wt % | Strength MPa | Young's modulus MPa | Layer b thickness μm | | Layer a thickness μm | | | |
| Example 19 | PAE1 | 99.7 | 70.0 | 12.5 | 163 | 125 | UPILEX S | 50 | 11.08 | 1.53 | 24.8 |
| Example 20 | PAE3 | 99.7 | 40.0 | 6.5 | 57 | 125 | UPILEX S | 50 | 11.52 | 6.57 | 11.1 |
| Example 21 | PAE5 | 90-100 | — | 13.8 | 180 | 125 | UPILEX S | 50 | 5.41 | 0.56 | — |
| Example 22 | PAE6 | 90-100 | — | 10.4 | 110 | 125 | UPILEX S | 50 | 6.38 | — | — |
| Example 23 | PAE1 | 99.7 | 70.0 | 12.5 | 163 | 125 | UPILEX R | 50 | 6.96 | 1.80 | 11.8 |
| Example 24 | PAE3 | 99.7 | 40.0 | 6.5 | 57 | 125 | UPILEX R | 50 | 7.86 | PI Break | 20.9 |

In the Table, the "PI Break" indicates that the polyimide film has suffered breakage before the first maximum load point.

The polyimide bonded specimens in Examples 7 to 24 have a higher average bond strength as measured by a T-peel test than those in Comparative Examples 2 and 3. Further, with respect to the form of breakage at the first maximum point, in the polyimide bonded specimens in Examples 7 to 24, a cohesive failure such that the polyether polyamide elastomer adhesive remains on the polyimide surface layer, or breakage of the polyimide occurred, whereas, in Comparative Examples, a cohesive failure was found in some of the specimens, but the other specimens suffered peeling at the interface.

When the first maximum bond strength is high, peeling at the end of bonded portion is unlikely to occur. When the average bond strength is high, the durability to the load on the entire bonded area is further increased.

The higher the average bond strength, the larger the work required to completely remove the adhesive composition and the adherend from each other. Therefore, the average bond strength can be used as an index for evaluating the bonding force of the adhesive composition. In other words, the adhesive composition in the present invention preferably has a high average bond strength.

The polyether polyamide elastomer adhesive composition in the present invention is strongly bonded with polyimide, particularly containing an aromatic ring. Further, among the polyimide containing an aromatic ring, the adhesive composition exhibits especially high bonding force with respect to polyimide containing 1 to 3 aromatic rings in the repeating units thereof.

When the polyether polyamide elastomer adhesive composition in the present invention is used in bonding thin polyimide films with each other, the start of peeling at the end of bonded portion is unlikely to occur.

INDUSTRIAL APPLICABILITY

The adhesive composition for polyimide of the present invention can be used in bonding polyimide with polyimide, or bonding polyimide with a material different from the polyimide, and therefore can be applied to the products using polyimide, for example, various household appliances, parts in relation to an engine for automobile or aircraft, and aerospace materials. Further, the adhesive composition for polyimide of the present invention can be applied to the use of reinforcement of polyimide merely by bonding only the polyether polyamide elastomer adhesive composition with polyimide. Therefore, as examples of industrial applications, the adhesive composition for polyimide can be applied to the fields in which it has been difficult to solely use polyimide because of a lack of strength, for example, belt members, such as a conveyor belt and a transfer belt for printer. Furthermore, the adhesive composition for polyimide of the present invention enables bonding merely through an easy process and therefore can achieve the production of products with high productivity, and thus can be advantageously applied to, e.g., the above-mentioned various industrial products and wire coating materials which are required to be mass-produced.

The invention claimed is:

1. A bonded composite having a polyimide resin and a resin composition P which together form an interface to be bonded with each other, wherein a polyimide compound in the polyimide resin is a polyimide compound obtained by subjecting 3,3',4,4'-biphenyltetracarboxylic dianhydride and p-phenylenediamine to polymerization and/or a polyimide compound obtained by subjecting pyromellitic dianhydride and 4,4'-diaminodiphenyl ether to polymerization, and the resin composition P comprises a polyether polyamide elastomer (component R) obtained by subjecting an aminocarboxylic acid compound (compound A1) and/or a lactam compound (compound A2), a polyether compound (compound B), and a dicarboxylic acid compound (compound C) to polymerization, the compound A1 being represented by the following formula (1):

$$H_2N-R^1-COOH \quad (1)$$

wherein $R^1$ represents a linking group comprising a hydrocarbon chain, the compound A2 being represented by the following formula (2):

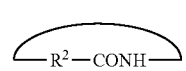

(2)

wherein $R^2$ represents a linking group comprising a hydrocarbon chain, the compound B being a triblock polyether amine compound (compound B1) represented by the following formula (3):

(3)

wherein x represents an integer of 1 to 20, y represents an integer of 4 to 50, and z represents an integer of 1 to 20
and/or a polyether compound (compound B2) represented by the following formula (4):

  (4)

wherein p represents an integer of 1 to 50,
the compound C being represented by the following formula (5):

  (5)

wherein $R^3$ represents a linking group comprising a hydrocarbon chain, and m is 0 or 1,
wherein the content of the component R in the resin composition is 80 to 100% by weight, and
the interface is included in a planar, tubular, or spherical surface.

2. A bonded composite which comprises a laminated structure formed by laminating a layer a comprised of a polyimide resin, a layer b comprised of a resin composition P, and a layer c comprised of a resin composition Q different from the resin composition P,
wherein the layer a and the layer b together form an interface to be bonded with each other, and the layer b and the layer c together form an interface to be bonded with each other, and
wherein the resin composition P comprises a polyether polyamide elastomer (component R) obtained by subjecting an aminocarboxylic acid compound (compound A1) and/or a lactam compound (compound A2), a polyether compound (compound B), and a dicarboxylic acid compound (compound C) to polymerization,
the compound A1 being represented by the following formula (1):

$$H_2N-R^1-COOH \qquad (1)$$

wherein $R^1$ represents a linking group comprising a hydrocarbon chain,
the compound A2 being represented by the following formula (2):

  (2)

wherein $R^2$ represents a linking group comprising a hydrocarbon chain,
the compound B being a triblock polyether amine compound (compound B1) represented by the following formula (3):

wherein x represents an integer of 1 to 20, y represents an integer of 4 to 50, and z represents an integer of 1 to 20
and/or a polyether compound (compound B2) represented by the following formula (4):

  (4)

wherein p represents an integer of 1 to 50,
the compound C being represented by the following formula (5):

  (5)

wherein $R^3$ represents a linking group comprising a hydrocarbon chain, and m is 0 or 1,
wherein the content of the component R in the resin composition is 80 to 100% by weight, and
wherein the interface is included in a planar, tubular, or spherical surface.

3. The bonded composite according to claim 2, wherein the resin composition Q is a polyimide resin.

4. The bonded composite according to claim 2, wherein the resin composition Q is different from both the polyimide resin and the resin composition P.

5. The bonded composite according to claim 2, which is in a planar, tubular, or spherical form.

6. The bonded composite according to claim 1, wherein the ratio of the total amounts of the compounds A1 and A2 to the total amounts of the compounds A1, A2, B, and C $\{(A1+A2)/(A1+A2+B+C)\}$ is 20 to 60% by weight.

7. The bonded composite according to claim 1, wherein the ratio of the total amounts of the compounds A1 and A2 to the total amounts of the compounds A1, A2, B, and C $\{(A1+A2)/(A1+A2+B+C)\}$ is 30 to 55% by weight.

8. The bonded composite according to claim 2, wherein the ratio of the total amounts of the compounds A1 and A2 to the total amounts of the compounds A1, A2, B, and C $\{(A1+A2)/(A1+A2+B+C)\}$ is 20 to 80% by weight.

9. The bonded composite according to claim 2, wherein the ratio of the total amounts of the compounds A1 and A2 to the total amounts of the compounds A1, A2, B, and C $\{(A1+A2)/(A1+A2+B+C)\}$ is 20 to 60% by weight.

10. The bonded composite according to claim 2, wherein the ratio of the total amounts of the compounds A1 and A2 to the total amounts of the compounds A1, A2, B, and C $\{(A1+A2)/(A1+A2+B+C)\}$ is 30 to 55% by weight.

11. The bonded composite according to claim 2, wherein a polyimide compound in the polyimide resin is a polyimide compound obtained by subjecting 3,3',4,4'-biphenyltetracarboxylic dianhydride and p-phenylenediamine to polymerization and/or a polyimide compound obtained by subjecting pyromellitic dianhydride and 4,4'-diaminodiphenyl ether to polymerization.

12. A method comprising:
applying a resin composition comprising a polyether polyamide elastomer (component R) obtained by subjecting an aminocarboxylic acid compound (compound A1) and/or a lactam compound (compound A2), a polyether compound (compound B), and a dicarboxylic acid compound (compound C) to polymerization, wherein
the compound A1 is represented by the following formula (1):

$$H_2N-R^1-COOH \qquad (1)$$

wherein $R^1$ represents a linking group comprising a hydrocarbon chain,
the compound A2 is represented by the following formula (2):

  (2)

wherein $R^2$ represents a linking group comprising a hydrocarbon chain,
the compound B is a triblock polyether amine compound (compound B1) represented by the following formula (3):

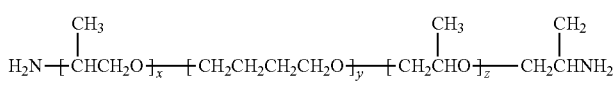

(3)

wherein x represents an integer of 1 to 20, y represents an integer of 4 to 50, and z represents an integer of 1 to 20
and/or a polyether compound (compound B2) represented by the following formula (4):

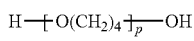 (4)

wherein p represents an integer of 1 to 50,
the compound C is represented by the following formula (5):

 (5)

wherein $R^3$ represents a linking group comprising a hydrocarbon chain, and m is 0 or 1,
wherein the content of the component R in the resin composition is 80 to 100% by weight, to a polyimide resin;
forming an interface between the resin composition and the polyimide resin; and
bonding the resin composition with the polyimide resin, wherein a polyimide compound in the polyimide resin is a polyimide compound obtained by subjecting 3,3',4,4'-biphenyltetracarboxylic dianhydride and p-phenylenediamine to polymerization and/or a polyimide compound obtained by subjecting pyromellitic dianhydride and 4,4'-diaminodiphenyl ether to polymerization.

13. The method according to claim 12, wherein the ratio of the total amounts of the compounds A1 and A2 to the total amounts of the compounds A1, A2, B, and C {(A1+A2)/(A1+A2+B+C)} is 20 to 80% by weight.

14. The method according to claim 12, wherein the ratio of the total amounts of the compounds A1 and A2 to the total amounts of the compounds A1, A2, B, and C {(A1+A2)/(A1+A2+B+C)} is 20 to 60% by weight.

15. The method according to claim 12, wherein the ratio of the total amounts of the compounds A1 and A2 to the total amounts of the compounds A1, A2, B, and C {(A1+A2)/(A1+A2+B+C)} is 30 to 55% by weight.

16. The method according to claim 12, wherein the interface is included in a planar, tubular, or spherical surface.

* * * * *